June 26, 1934.  A. C. WOOD  1,964,238
CUP FOR CONFECTIONARIES
Filed Sept. 21, 1932
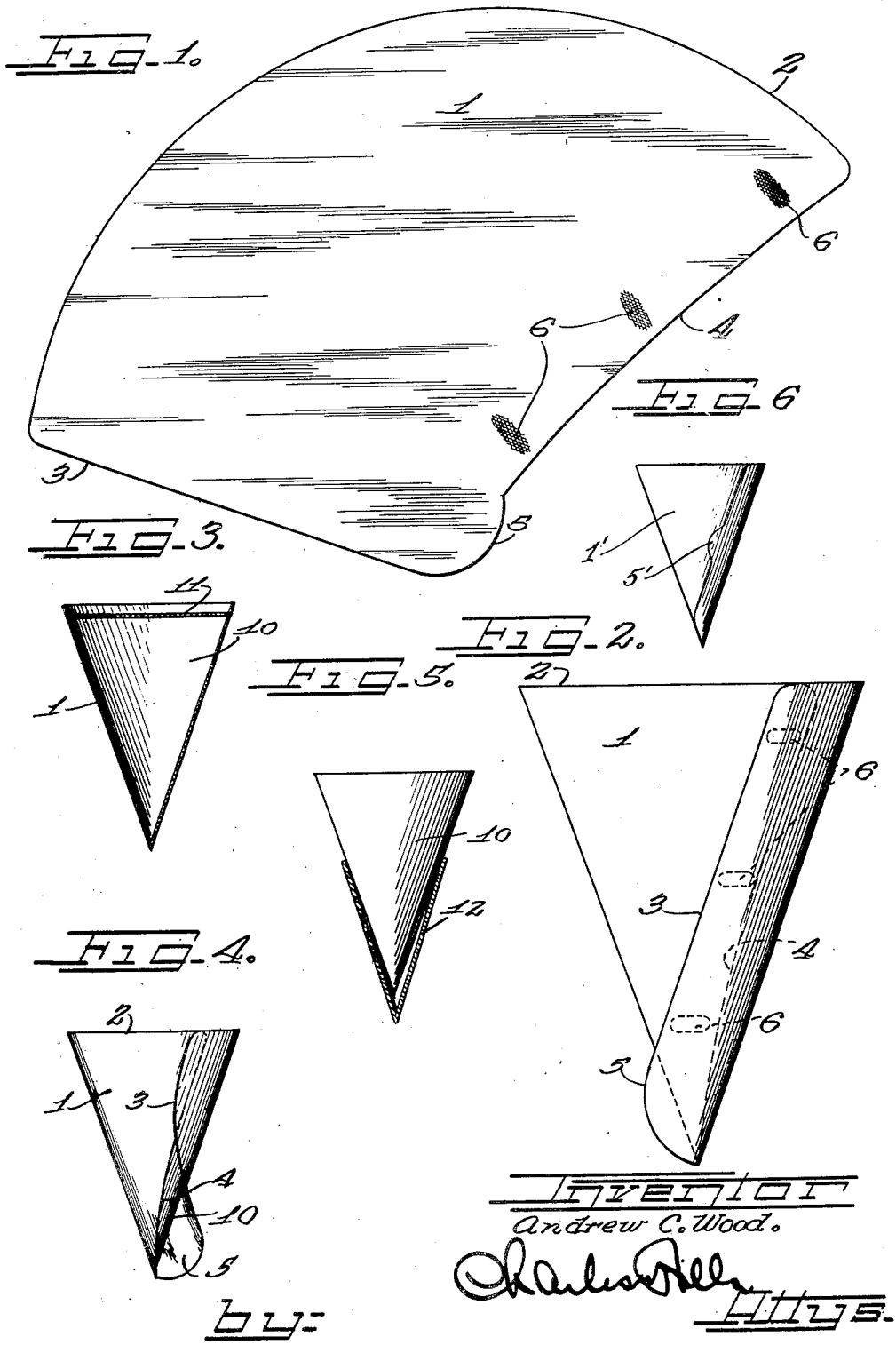
Inventor
Andrew C. Wood.
by
Attys.

Patented June 26, 1934

1,964,238

UNITED STATES PATENT OFFICE 1,964,238

CUP FOR CONFECTIONARIES

Andrew C. Wood, Chicago, Ill., assignor to Vortex Cup Company, Chicago, Ill., a corporation of Illinois Application September 21, 1932, Serial No. 634,209

4 Claims. (Cl. 229—1.5)

This invention relates to the packaging of confectionaries and more particularly to a paper cup for packaging confectionaries such, for example, as ice cream.

Heretofore it has been the practice to dispense ice cream in the form of ice cream cones by scooping a ball of ice cream from a container and disposing it in a cake or candy cone. It of course follows that such practice is not always satisfactory for the reason that unless the utensil used in placing the ice cream in the cone is clean dirt germs are also apt to be placed in the cone along with the ice cream. Then, too, it is not customary to measure the ice cream placed in the cone with any degree of accuracy and, as a result, this practice does not result in a uniform dispensing of the ice cream to different customers.

It is the aim of this invention to provide a method of packaging ice cream which is not only more sanitary than existing methods but also enables the quantity of ice cream being dispensed to be measured beforehand so that customers purchasing such ice cream will all receive the same amount.

Another object of the invention pertains to the provision of a paper receptacle in the form of a conical cup in which ice cream or some other confectionary may be sold to the confectionary shops in a condition ready to be placed in cones at the time of dispensing, and all that is required to place the ice cream in the cone is to tear the paper cup off of the ice cream and to drop the ice cream into the cake or cereal cone.

Still another object of the invention relates to the provision of a conical like cup in which a confection such as ice cream is adapted to be packed and which cup is provided with a tab-like projection at the seam or particularly at the apex or point of the cup by means of which the paper may be torn from the frozen confection when it is desired to dispense the confection in a cake cone, dish or other receptacle.

In accordance with the general features of this invention, there is provided a paper blank adapted to be formed into a conical cup, which blank is in the form of a segment of a circle having a curved outer edge for defining the circular mouth of the cup and two inwardly converging sides adapted to be glued together when the blank is rolled into a conical cup which sides terminate at the apex of the cup in a tab for disposition part way around the apex or point of the cup and comprising the means by which the cup may be stripped from a frozen confection when it is desired to dispense the same.

Other objects and features of this invention will more fully appear from the following detailed description taken in connection with the accompanying drawing which illustrates a single embodiment thereof and in which Figure 1 is an elevation of a cup blank embodying the features of this invention.

Figure 2 is an elevation of a conical cup rolled from the blank shown in Figure 1.

Figure 3 is a vertical sectional view through my novel cup drawn to a reduced scale and showing the confection in the cup with a cap disposed in the top of the cup over the confection.

Figure 4 is a view similar to Figure 2 on a reduced scale and showing the manner in which the tab is used to strip the cup from the frozen confection therein.

Figure 5 is a view of a cake cone in which the confection taken from the paper cup has been dropped.

Figure 6 is a side elevation of a modified form of cup.

The reference numeral 1 designates generally a blank which may be made of any suitable material such, for example, as paper of the type commonly used in paper drinking cups and the like. This blank 1 is in the form of a segment of a circle and has an arcuate or curved outer edge 2 for defining the mouth of the conical cup to be made from the blank. The ends of this curved edge 2 terminate in inwardly converging side edges 3 and 4 of which edge 3 is a substantially straight edge whereas edge 4 is slightly curved inwardly to facilitate manufacture. Edge 3 may or may not be curved to effect a saving in paper.

The inner extremities of these two edges 3 and 4 terminate in a curved lateral extension or tab which is in line with the edge 3 but projects outwardly away from edge 4. This projection or tab 5 constitutes a stripping tab for the cup or, in other words, is the means by which the cup may be stripped from a frozen confection when it is desired to dispense the confection.

Inasmuch as my paper cup is especially adapted for use in connection with frozen confections such as ice cream, it will of course be appreciated that it is not necessary to maintain a seal along the entire glued portion of the cup and, accordingly, I provide the cup blank adjacent the edge 4 with a plurality of spaced dabs of glue which, for example, may be three in number and are designated by the reference numeral 6. Also this glue need not be placed at the apex of the cup since the semi-liquid characteristics of the contents when deposited in the cup do not require any such seal. The absence of the glue at this point leaves the tab projecting from the main body and thus it may easily be taken hold of.

The cup blank 1, due to its contour and construction, is adapted to be rolled into the form of a conical cup as shown in Figure 2. This rolling operation may be effected by any suitable equipment such, for example, as is now in use in the manufacture of conical paper drinking cups. It will be noted that after the cup blank 1 is formed into the conical cup, the tab 5 projects away from the body of the cup adjacent the apex or point of the cup, so that it is readily accessible for the purpose of pulling it to strip the cup off a frozen confection such as the confection 10 shown in Figures 3 and 4 as being disposed in the cup. This confection may be deposited or packed in the cup by any suitable apparatus and as noted hereinabove is afterwards frozen in the cup. Also in order to insure that the confection will be kept free of dirt germs, a cap such as the cap 11 may be pressed down into the mouth end of the cup onto the top of the frozen confection 10. Any suitable method may be used to secure and seal the cap in place. For example, the edge of the cup may be crimped inwardly to bind the flange of the cap thereto. This cap 11 is preferably applied at the time that the semi-liquid confection 10 is deposited in the cup prior to the freezing operation.

After the semi-liquid confection has been frozen in the cup, the same may be shipped packed in ice to the outlying confectionary shops.

When a customer asks for a cone of ice cream, the confectionary dealer simply removes one of the conical packages from the freezer, strips the paper cup from the frozen confection by means of the tab 5 as shown in Figure 4 and drops the frozen cone 10 into a cake cone 12 as shown in Figure 5.

In Figure 6 I have illustrated a modification of the invention in which the cup blank 1' has the stripping or tearing tab 5' disposed in an intermediate position or substantially centrally of the cup body.

It will of course be appreciated that the purchaser of such an ice cream cone is assured of cleanliness in the product he is buying as a result of this novel method of handling and is also assured of receiving the same measure of ice cream for his money as is being dispensed to other customers.

Now I of course desire it understood that although I have illustrated and described in detail the preferred embodiment of the invention, the invention is not to be thus limited but only insofar as defined by the scope and spirit of the appended claims.

I claim as my invention:

1. As an article of manufacture, a blank for a conical cup adapted to receive a frozen confection and comprising a segment of a circle including a curved outer edge for defining the mouth of the cup, and inwardly converging side edges extending from said outer edge toward the point of the cup to be rolled from the blank, and terminating at their inner extremities in a tear tab, one of said side edges having the margin of the blank adjacent thereto provided with spaced dabs of adhesive for holding the blank in a conical shape and being discontinuous so as to facilitate the tearing or stripping of the blank from a confection by means of said tear tab.

2. As an article of manufacture, a blank for a cup adapted to receive a frozen confection comprising a segment of a circle including a curved outer edge for defining the mouth of the cup, inwardly converging side edges extending from said outer edge toward the lower end of the cup to be formed from the blank and having disposed adjacent their inner extremities a tear tab, one of said side edges having a margin of the blank adjacent thereto provided with adhesive of such amount and character as merely to hold the cup in shape but being insufficient to preclude ready separation of the side edges when the blank is stripped from a confection therein by said tear tab.

3. As an article of manufacture, a blank for a cup adapted to receive an edible confection comprising a segment of a circle including a curved outer edge for defining the mouth of the cup, and inwardly converging side edges extending from said outer edge toward the lower end of the cup to be formed from the blank, one of said side edges having a margin of the blank adjacent thereto provided with adhesive of such amount and character as merely to hold the cup in shape but being insufficient to preclude ready separation of the side edges when the blank is stripped from a confection therein, one of said side edges having a free portion adapted to serve as a tearing tab in the stripping operation.

4. As an article of manufacture, a cup adapted to receive an edible confection and made from a blank including an outer edge for defining the mouth of the cup and side edges which are overlapped to form a seam in the cup, said side edges being held together by adhesive of such amount and character as merely to hold the cup in shape but being insufficient to preclude ready separation of the side edges when the blank is stripped from a confection therein, one of said side edges having a free portion adapted to serve as a tearing tab in the stripping operation.

ANDREW C. WOOD.